United States Patent [19]
Moore et al.

[11] 4,178,964
[45] Dec. 18, 1979

[54] DOUBLE VALVE MECHANISM FOR CONTROLLING FLUID FLOWS

[76] Inventors: Marvin L. Moore, 16204 Diana La., Apt. 323A, Houston, Tex. 77062; Karen H. Moore, 4520 Duval, Apt. 203, Austin, Tex. 78751; William M. Moore, 8820 Mountain Path Cir., Austin, Tex. 78750

[21] Appl. No.: 734,829

[22] Filed: Oct. 22, 1976

[51] Int. Cl.² ............... F16K 11/06; F16K 11/20
[52] U.S. Cl. .................. 137/625.4; 137/606; 137/614.11
[58] Field of Search ............ 251/327, 326, 210; 137/625.12

[56] References Cited

U.S. PATENT DOCUMENTS

| | | | |
|---|---|---|---|
| 2,651,320 | 9/1953 | Hirsch et al. | 251/327 X |
| 3,113,757 | 12/1963 | Nixon | 251/327 X |
| 3,701,359 | 10/1972 | Worley et al. | 137/375 |
| 3,780,982 | 12/1973 | Kemp | 251/210 |
| 3,889,925 | 6/1975 | Brooks | 251/327 |

*Primary Examiner*—Arnold Rosenthal
*Attorney, Agent, or Firm*—Arnold, White & Durkee

[57] ABSTRACT

A substantially leak-free arrangement for isolating at least two fluid streams from each other and for conducting each fluid stream into a mixing zone is characterized in a first embodiment by a casing having substantially parallel upstream and downstream partitions, each partition being provided, for each fluid stream, with an orifice of a predetermined cross-section. Defined within the casing between the partitions is a valve chamber in which a valve plate, having a flow passage corresponding to each orifice in the partitions, is moveable from a first, closed, to a second, open, position. The valve plate in the first, closed, position prevents fluid communication between each of the orifices in the first partition and the corresponding orifices in the second partition. The orifices are arranged within the partitions so that, as the valve plate slidably moves from the closed to the open position, the orifices in the downstream partition are in fluid communication with the corresponding passages in the valve plate before those passages communicate with the orifices in the upstream partition. With the valve plate in the second, open, position, the passages in the valve plate register completely with the corresponding orifices in the first and second partitions to provide unobstructed flow paths for each fluid stream to a mixing region disposed downstream of the second partition. In a second embodiment of the invention, a first valve member and a second valve member cooperate to define a double valve arrangement for a single fluid flow, both valves being disposed upstream of a common mixing region. Both valves are operatively associated with an externally disposed, pivotally mounted actuator member. Movement of the actuator opens both the first and the second valves so as to introduce the fluid into the mixing region.

9 Claims, 9 Drawing Figures

U.S. Patent  Dec. 18, 1979  Sheet 1 of 2  4,178,964
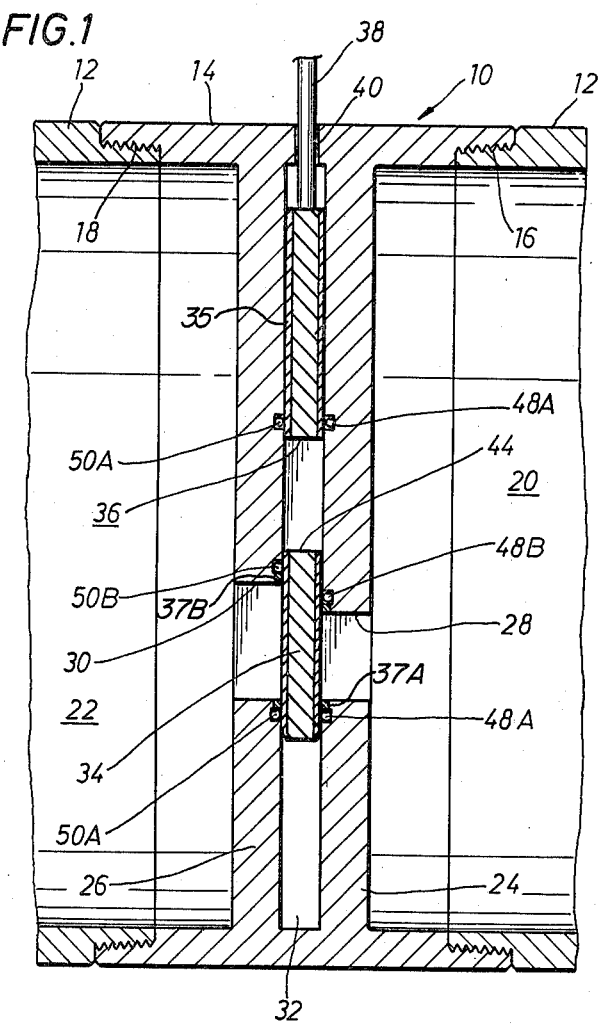
FIG. 1
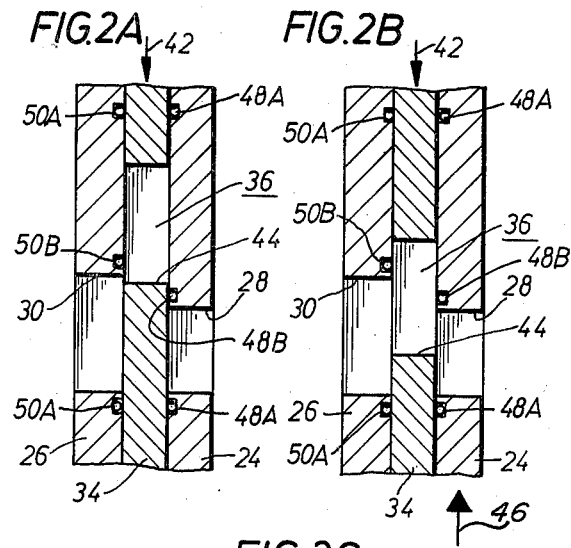
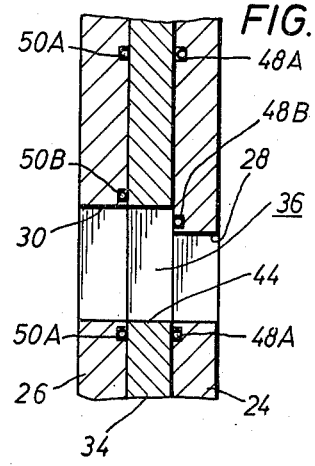
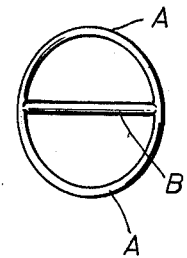
FIG. 3
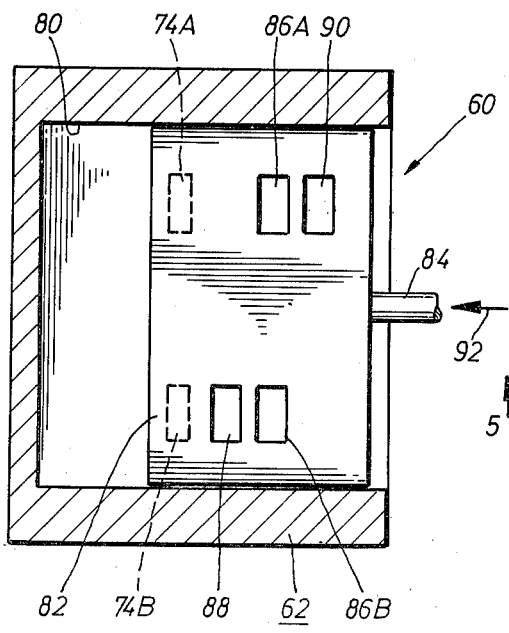
FIG. 6
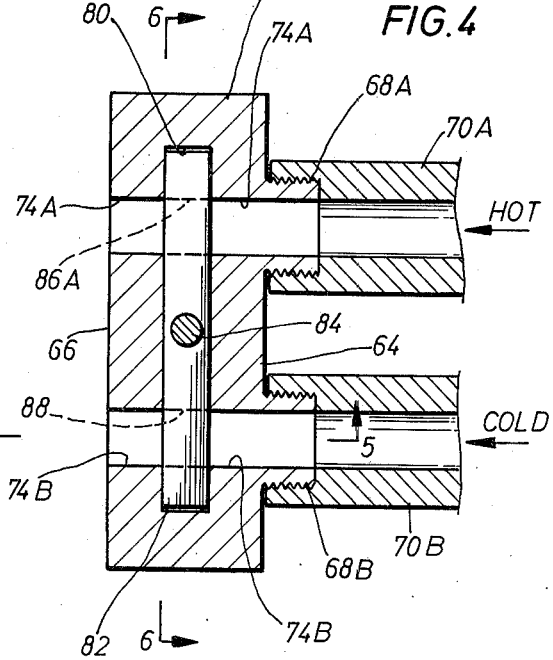
FIG. 4

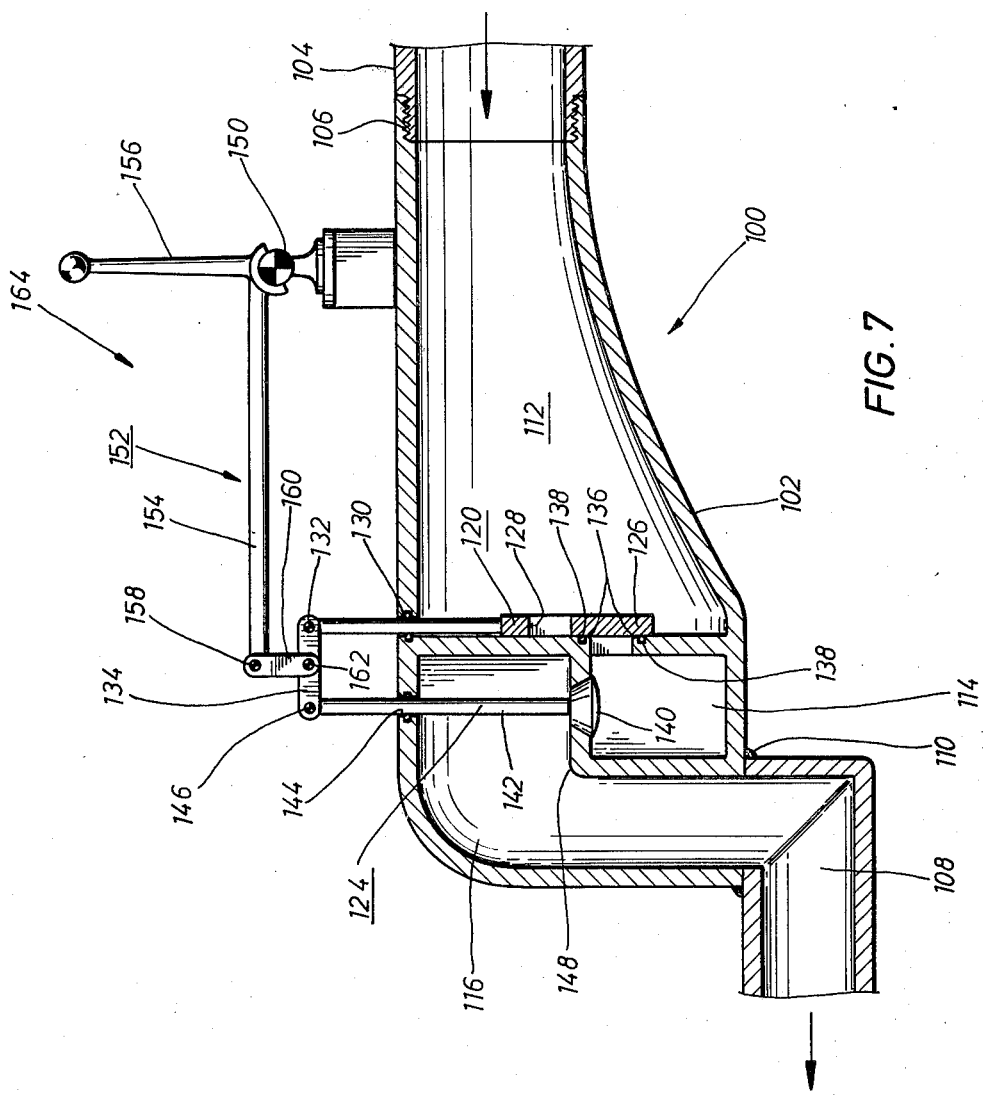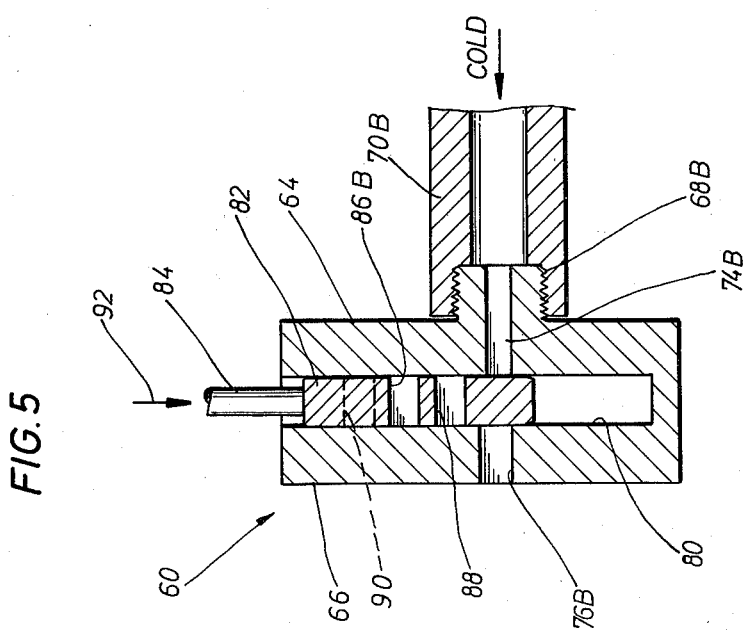

DOUBLE VALVE MECHANISM FOR CONTROLLING FLUID FLOWS

BACKGROUND OF THE INVENTION

1. Field of the Invention

This invention relates to flow control apparatus and, in particular, to flow control apparatus utilizing a double valve arrangement to control two fluid streams.

2. Description of the Prior Art

In flow control apparatus a frequently encountered problem is the maintenance of a substantially leak-free engagement between a valve plug member and its associated valve seat. It was early appreciated that the provision of a dual valve plug arrangement enhanced the ability of the apparatus to maintain substantially leak-free operation for periods of time in excess of the normal single valve plug-seat arrangement. U.S. Pat. No. 1,256,759 (Wilson) typifies a tandum connection of first and second valve members. U.S. Pat. No. 1,206,319 (Flanders) discloses a two valve motive fluid controller for turbine apparatus in which both valves are operatively associated to an externally pivoted actuator.

Other valve apparatus of the prior art, such as U.S. Pat. Nos. 1,593,260 (Hittenmeyer), 2,403,029 (Smith), and 2,830,620 (Shuptrine) disclose double valve constructions in which the first valve is concentrically disposed relative to the second valve and operable such that opening of the first valve is delayed for a predetermined time after the opening of the second valve. U.S. Pat. No. 1,956,082 (Schneible) relates to a double valve arrangement disposed on a common shaft. U.S. Pat. No. 1,540,954 (Rockwell) disposes a two valve plug arrangement in which a first valve concentrically surrounds the shaft of the second, plug-type valve and wherein movement of a common shaft opens the plug-type valve before openings provided in the concentric valve member register with an outer, stationary partition to permit fluid passage from the valve inlet to the outlet.

Other valve arrangements are known in the art which utilize a sliding plate to separate and prevent fluid communication between a valve inlet and outlet. For example, U.S. Pat. No. 3,701,359 (Worley) discloses an insulated slide valve wherein the sliding valve plate moves away from sealed contact with a large outlet pipe before the valve plate moves away from seated engagement with a smaller diameter inlet pipe. Once the plate is opened, however, a discontinuity in the flow passage occurs, thus leaving open the possibility that foreign matter entrained in the fluid flow may become lodged in the recess provided for seating of the valve plate, thus negating the capability of the valve to fully seat in the closed position. Also, wearing effects occur across the inlet and outlet edges of the conduits as the plate is withdrawn in the face of a pressurized fluid.

U.S. Pat. No. 3,575,377 (Carlton) illustrates a closure seal for a gate valve in which pressurized fluid from each side of the valve plate is utilized to maintain seal integrity between the valve plate and the valve casing. U.S. Pat. No. 3,926,408 (Vogeli) discloses a gate valve for controlling fluid flow.

In the field of flow control of two fluid streams by a single operator or actuator, such as control of hot and cold water into a basin, U.S. Pat. No. 3,460,571 (Moen) and U.S. Pat. No. 3,620,254 (Mongerson, et al.) disclose handle valve arrangements. Also, valves known in the art as the the Delta valve, manufactured by Delta Faucet Company, of Greensburg, Indiana, are available. Such valves utilize a rotatable ball member with flow passages therethrough which rotates about an axis thereof to align with separate fluid flow conduits to conduct fluid from those conduits to a mixing region downstream of the ball. Also available in the prior art is a valve manufactured by Peerless Valve Company, which utilizes a cylindrical member as the valve element. The cylinder is provided with a passage having one terminus in the planar end of the cylinder and a second terminus in the curved surface of the cylinder. The cylindrical member is rotated about an axis therethrough to bring the second terminus of the passage into registration with an outlet orifice provided in the valve housing.

However, as appreciated by those with skill in the art, the machining of a precise spherical or cylindrical members, as the ball and its seating chamber or the cylinder and its associated seating chamber, requires careful workmanship and specialized machinery in order to avoid leakage around machined imperfections when the ball or cylinder is placed within the valve and to avoid early failure when operated due to surface imperfections of the curved members.

It is therefore of advantage to provide a valve for control of two fluid streams which utilizes a configuration of a flat plate or plates as the valve element. It is advantageous to provide a double-valve arrangement for control of two fluids which provides substantially leak-free operation for extended period of time yet utilizes the sliding type valve plug as the only moveable element. It is of further advantage to provide a valve of such construction so that the outlet orifice is open prior to the opening of the inlet orifice. It is of further advantage to provide a valve plug having first and second partition, each having an orifice therein, each of which cooperate to define a valve plate chamber in which a rectilinearly or rotationally slidable valve plate as disposed. It is advantageous to provide a valve so that sliding of the valve plate rectilinearly within or angularly into and out of the valve plate chamber places a passage disposed in the valve plate into communication with the outlet orifice prior to registration with the inlet orifice. It is of further advantage to provide a valve wherein the inlet and outlet orifices register to provide an enclosed flow passage to avoid accumulation of foreign matter in any open recesses within the valve.

It is also advantageous to provide a double valve arrangement utilizing a first, upstream, valve of a sliding type and a second, downstream, valve of the plug type and to provide a common, externally-pivoted actuator such that movement of the actuator opens the downstream valve prior to the unseating of the upstream valve.

SUMMARY OF THE INVENTION

This invention, in the first embodiment thereof, provides an arrangement for isolating at least two fluid streams from each other and for conducting each fluid into a mixing zone. The invention includes a substantially leakfree, long life, double valve apparatus having a casing with substantially parallel first and second partitions provided therein. Each of the first and second partitions has an orifice for each fluid stream provided therein. The partitions cooperate with the casing to define a valve plate chamber in which is disposed a moveable valve plate, itself having passages extending therethrough corresponding to each orifice in each partition. The valve plate is moveable within the valve plate chamber from a first, closed, position in which fluid communication between the orifices in the first and second partitions is prevented, to a second, open, position in which the orifices are in registration with the passages in the valve plate and through which the orifices are in fluid communication with each other. The orifices in the outlet partition are arranged so that they are in fluid communication with the passages in the valve plate before those passages are in fluid communication with the orifice in the inlet partition. Suitable seals may be provided between the valve plate and the first and second partitions to further prevent leakage between the orifices in the partitions and the valve plate chamber. Upon closure of the valve plate the orifices in the upstream partition are taken out of fluid communication with the passages through the valve plate as the valve plate moves from the open to the closed position to thus isolate the inlet orifices from the outlet orifices before the outlet orifices are taken out of fluid communication with the flow passages. In this manner it is seen that the downstream orifice opens before and closes after the upstream orifice. Provided also are orifices in the partitions which selectively permit passage of one of the fluids into the mixing region to the exclusion of the other, to thus permit only one of the fluids to be introduced to the mixing region.

The valve embodying the teachings of this invention in the second embodiment thereof provides a double valve arrangement having a first, upstream, valve member of a sliding plate type and a second, downstream, valve member of the plug type affixed to a common, externally mounted, pivoted actuator. Movement of the actuator opens both the upstream and the downstream valve members to introduce a fluid into a mixing region downstream of both valve members. A double valve arrangement of the second embodiment is provided for each fluid stream, with the actuators of each valve arrangement being proximate to each other to permit one-hand control of two or more fluid streams.

BRIEF DESCRIPTION OF THE DRAWINGS

The invention will be more fully understood from the following detailed description of a preferred embodiment, taken in connection with the accompanying drawings, in which:

FIG. 1 is an elevational view, totally in section, of a double valve apparatus illustrating the principles of operation of a single sliding valve plate embodying the teachings of this invention;

FIGS. 2A-2C are diagrammatic illustrations of the opening and closing sequence of a double valve as shown in FIG. 1;

FIG. 3 is a plan view of a seal element used in a double valve as shown in FIG. 1; FIG. 4 is a plan view of a valve arrangement for conducting at least two fluids into a mixing region embodying the teachings of this invention;

FIG. 5 is a side elevational view taken along lines 5—5 of FIG. 4;

FIG. 6 is a front elevational view taken along lines 6—6 of FIG. 4; and,

FIG. 7 is an elevational view, entirely in section, of a second embodiment of a double valve apparatus embodying the teachings of this invention.

DESCRIPTION OF THE PREFERRED EMBODIMENT

Throughout the following description, similar reference numerals refer to similar elements in all figures in the drawings.

The principles of operation of a double valve apparatus used within the two fluid flow control arrangement embodying the teachings of this invention are illustrated. With reference first to FIG. 1, a double valve apparatus generally indicated by reference numeral 10 is shown disposed within a fluid line indicated by numeral 12. The valve 10 comprises a valve casing 14 suitably connected, as by threaded connections 16 and 18, to the fluid line 12. It is, of course, understood that other suitable connections may be provided between the valve 10 and the fluid flow line 12 in which it is disposed.

The casing 14 includes an inlet region 20 and an outlet region 22 defined, respectively, by the interior of the casing 14 and a first upstream partition 24 and the interior of the casing 14 and a second downstream partition 26. The partitions 24 and 26 are substantially parallel to each other and each has provided therein an orifice 28 and 30, respectively. The orifices 28 and 30 maybe any convenient shape, but are shown in FIG. 1 as rectangular in cross section and oriented such that the longer side of each of the rectangular orifices 28 and 30 are substantially parallel.

The partitions 24 and 26 cooperate with the casing 14 to define a valve plate chamber 32 in which is moveably disposed a valve plate or wafer 34. The valve plate or wafer 34 can be fabricated of ceramic, metal, plastic, or any other suitable material coated with a layer 35 of predetermined thickness of suitable, low friction, material such as Teflon, although other materials may be used.

The valve plate 34 is rectilinearly or rotationally slidably moveable within the valve plate chamber 32 from a first, closed, position shown in FIG. 1 to a second, open, position and has provided therein a through passage 36. By rotationally slidable, it is meant that the plate 34 may be angularly moveable to slide into and out of the valve plate chamber 32 from side-to-side. Rotational, in this sense, is not taken to connote movement of the plate about an axis thereof. A suitable valve actuator 38 extends externally of the casing 14 and is connected to a suitable valve operator in a manner known to those skilled in the art to initiate the rectilinear or rotational sliding motion of the valve plate 34 within the valve plate chamber 32. Any valve packing, as at 40, may be provided to maintain sealed integrity between the interior of the valve plate chamber 32 and the exterior of the valve 10. The passage 36 may also be of any desirable configuration although it is best to conform the cross sectional area of the passage 36 to the same cross sectional shape as the orifices 28 and 30. It is also found better practice to dispose the long leg of the rectangular opening 36 in the same direction as the long sides of the orifices 28 and 30. It is also desirable to provide the opening 36 in the valve plate 34 substantially the same height as the orifice 30 in the downstream partition 26, both of which being greater in height than the orifice 28 in the upstream partition 24.

The mode of operation of the valve shown in FIG. 1 is best illustrated in FIG. 2A through 2C. It is noted that the opening and closing interactions of the orifices and passage are the same if the rotational, instead of rectilinearly slidable, mode of the valve is utilized. With the valve 10 as shown in FIG. 1 in the first, closed position, the valve plate 34 totally blocks and prevents fluid communication between the inlet orifice 28 provided in the upstream partition 24 and the outlet orifice 30 provided in the downstream partition 26. Movement of the valve plate 34 in response to a force imposed on the actuator stem 38 in the rectilinear direction indicated in FIG. 2A by reference arrow 42 brings, after a predetermined time, the lower edge 44 of the orifice 36 into fluid communication with the outlet orifice 30 provided in the downstream partition 26. It is noted that communication between the passage 36 and the orifice 30 occurs while the orifice 28 in the upstream partition 24 is still isolated from fluid communication with the passage 36.

Continued rectilinear movement of the valve plate 34 in the direction of arrow 42 will, after a predetermined time, dispose the lower edge 44 of the orifice 36 in the communication with the inlet orifice 28. In the full open position illustrated in FIG. 2C, the passage 36 registers totally with the inlet orifice 28 and the outlet orifice 30 to permit fluid communication to occur between these orifices and thus permit fluid flow from the inlet region 20 to the outlet region 22.

It is noted that due to the sequential opening of the downstream orifice 30 prior to the opening of the upstream orifice 28, the effects of direct fluid impingement on the outlet orifice from the passage of fluid therethrough is avoided, thus providing a substantially longer life span for valves embodying the teachings of this invention. It is noted in connection with prior art valves, such as that described in U.S. Pat. No. 3,701,359, that withdrawal of a sliding plate opens a volume in which foreign matter entrained in the fluid flow may collect, which has the deleterious effect of inhibiting reseating of the valve plate.

It is also seen that as long as the downstream orifice 30 is opened first and closed last (with respect to the upstream orifice 28), the shapes and sizes of the orifices 28 and 30 may be any convenient shape and size. For example, the upstream orifice 28 may be circular with the downstream orifice 30 ovate. Also, by way of example, the orifices 28 and 30 may each be rectangular, with different dimensions but having the same area. The height of the passage and orifices have been discussed earlier. The important criterion is that movement of the valve plate 34 within the valve plate chamber 32 places the passage 36 in the valve plate 34 in fluid communication with the outlet orifice 30 before the inlet orifice 28. This provides the advantage that fluid friction and other deleterious wearing effects upon the outlet orifice 30 are avoided and a longer life of substantially leak-free operation may be expected.

The closing sequence of the valve 10 is shown by examination of FIGS. 2B and 2A in reverse order with movement of the valve actuator 38 in a rectilinear direction indicated by arrow 46 (opposite the arrow 42) again isolates the inlet orifice 28 from the passage 36 before the lower edge 44 of the passage 36 leaves fluid communication with the outlet orifice 30.

It is thus appreciated and understood that the downstream orifice 30 opens into fluid communication with the passage 36 before the inlet passage 28 and leaves fluid communication with that passage after the orifice 28 is isolated therefrom.

The inlet and outlet partitions 24 and 26 may be integrally cast with the valve casing 14 and either polished or otherwise accurately finished internally. Alternatively, the partitions 24 and 26 may be separately manufactured and installed within the valve body 14 by threading or other means. The valve plate 34 is, as mentioned above, manufactured of any suitable corrosion-resistant material and coated with a suitable layer of predetermined thickness of corrosion-resistant material to maintain a long operative life. Yet another manufacturing mode for a valve 10 embodying the teachings of this invention is to fabricate the partitions 24 and 26 with the plate 32 in place and install the unit within the valve flow line 12.

For some valves, it may be desirable to dispose first and second seal means 48 and 50, respectively, between the valve plate 34 and the first partition 24 and the valve plate 34 and the second partition 26 for sealing each respective partition from the plate. The seal means 48 and 50 may be O-ring seals of the type shown in FIG. 3 so as to completely encompass the orifices 28 and 30 to thereby prevent fluid communication between the orifices 28 and 30 and the interior of the valve plate chamber 22. The O-rings include a generally circular portion A with a transverse branch B diametrically disposed relative thereto. The O-rings are mounted within grooves provided on the partitions 24 and 26 about the fixed orifices 28 and 30, as shown in FIG. 1. Of course, the seals may be mounted in suitable grooves provided on the faces of the valve plate, if desired. It is again noted in regard to FIG. 2 that while the orifices 28 and 30 register with the passage 36, the only fluid flow path is through the so registered openings and that any accumulated or entrained matter within the fluid flow is not permitted to drop or fall into any portion of the valve plate chamber, as is the situation with the last-mentioned prior art patent. Of course, other seal configurations, in addition to those described above, may be utilized.

It is also advantageous to provide coatings of predetermined thickness 37A and 37B of a suitable low-friction, corrosion resistant material such as Teflon, to relatively abrading surfaces as between the valve plate 34 and the partitions 24 and 26 to reduce friction and corrosion therebetween. It is also desirable to provide a coating of similar materials on those surfaces exposed to the fluid flow to reduce corrosion. It is apparent to those skilled in the art that sealing may occur between members disposed with close tolerances to each other without the necessity of other seal elements. However, to further insure leak-tight seals, O-ring elements as described above may be utilized. Factors relevant in determining the optimum seal configuration include, for example, the pressure of the fluids involved, the clearances between the sliding plate and fixed partitions, the resiliency of the material used for the O-rings, the depth, shape and location of the mounting grooves. All these, and perhaps other, factors are considered when providing an overall seal arrangement for a valve embodying the teachings of this invention.

It may thus be understood and appreciated by reference to the foregoing that the valve embodying the teachings of this invention above-described has an inlet orifice 28 which opens after and closes before the outlet orifice 30 to thereby achieve a double valve arrangement with very little, if any, wear or abrasion about the outlet orifice and its seal. In this way, a substantially longer life, leak-free double valve arrangement utilizing only one moveable member is provided. As discussed above, in addition to rectilinearly slidable motion of the plate into the open position within the valve plate chamber, slidable rotation of the valve plate 34 to place the opening 36 into fluid communication with the orifice 30 in the downstream partition 30 prior to communication with the orifice 32 in the upstream partition 28 is within the contemplation of this invention. It is also noted that a valve with more than one slidable plate, used in conjunction with more than the two fixed partitions shown in FIG. 1, may be provided, with registrable passages and orifices, and remain within the scope of this invention.

Referring now to FIGS. 4, 5, and 6, respectively are shown plan, side elevational and front elevational views of a flow arrangement for controlling at least two fluid flows and embodying the principles of a double valve apparatus shown in FIGS. 1 through 3.

In FIGS. 4 through 6, a valve 60 includes a valve casing 62 having an upstream partition portion 64 and a downstream partition portion 66. Threadedly connected to the upstream partition 64, as by bosses 66A and 66B, are fluid pipelines 70A and 70B. For example, the pipelines 70A and 70B may, respectively, conduct hot and cold water to the valve 60. Of course, any number of inlet connections conducting any number of fluids into the valve 60 may be provided. The valve 60 conducts at least two isolated fluid streams into a downstream mixing region 72. The mixing region 72 may be integrally connected with the valve 60 or, as shown in the FIGS. 4 through 6, external thereto. As an example, the mixing region 72 may be a wash basin or the like, in which it is desired to simultaneously introduce hot and cold water.

The upstream partition 64 includes first and second orifices 74A and 74B, the member of orifices 74 being equal to the number of fluid streams connected to the upstream partition 64. The downstream partition 66 includes a number of downstream orifices 76A and 76B, the number corresponding to number of upstream orifices provided.

The casing 62 has a valve chamber 80 defined therein, in which chamber 80 is moveably disposed a valve plate 82. The plate 82 may be rectilinearly or rotationally slidable within the chamber 80. The valve plate 82 is moved within the chamber 80 by an actuator 84 extending from the casing 62. A plurality of passages 86A and 86B, corresponding to the number of orifices 74 and 76, extend through the valve plate 82. Other passages 88 and 90 are disposed within the valve plate 82 for reasons which will be made clearer herein.

The orifices 74 and 76 and the passages 86 are substantially rectangular in cross section, although it is understood that any desired configuration may be utilized. As the case in the valve shown in FIGS. 1 through 3, the downstream orifices 76 are sized so as to come into fluid communication with the respective passages 86 in the valve plate 82 before those passages open into communication with the upstream orifices 74. Thus, the downstream orifices 76 open first into communication with the passages 86 and close out of communication last, with respect to the upstream orifices 74.

In operation, if it is desired to conduct both hot and cold fluids from their inlet lines 70A and 70B, respectively, into the mixing region 72, the actuator 84 is moved in the direction indicated by arrow 92, to bring the passages 86 into fluid communication firstly with the orifices 76 and then with the passages 74. Thus, full registration between the passages 86 and the orifices 74 and 76 conducts the hot and cold fluids into the mixing region 72. Note that due to the particular orientation of the rectangular passages and orifices, relatively short movement of the actuator 84 opens the passages into communication with the orifices. Of course, if other configurations and orientations of the passages and orifices are used, different flow results are obtained. It is also noted that the downstream orifices 76 open into communication with the passages 86 before the upstream orifices 74 and close from communication after the orifices 74 to prevent deleterious wearing effects about the downstream orifices. Further, it is noted that movement of the valve plate passages into registry with the orifices provides an enclosed flow path from upstream of the valve 60 to the mixing region 72, thus preventing foreign matter entrained in the fluids from depositing with the valve plate chamber 80. Thus, positive sealing between the elements (which may be provided with a suitable coating of law-friction corrosion-resistant material) insures a fluid-tight seal. Alternatively, suitable O-ring seals, similar to those shown in connection with FIG. 3, may be provided.

In addition to providing mixing streams of fluid with the mixing region by one-handed actuation of the actuator 84, it may be observed that alternate conduction of either hot or cold fluid from the respective fluid line 70A or 70B into the mixing region 72 may be provided. For example, continued actuation of the actuator 84 in the direction 92 moves the passages 86 out of communication with the orifices 74 and 76, and moves passage 88 into communication with the orifices 76B and 74B (the orifice 76B opening into the passage 88 before the orifice 74B) to conduct cold water only into the region 72. The other orifices 74A and 76A are isolated from each other when the passage 88 communicates with both orifices 74B and 76B. Movement of the actuator 84 in a direction 94 (opposite to the direction 92) places the passage 90 in fluid communication with the orifices 76A and 76A to conduct only hot water to the mixing region 72.

Thus, it is seen that the arrangement embodying the teachings of this invention can selectively conduct hot water, cold water, or both hot and cold water to a mixing region by single-handed operation of the actuator 84. It is understood, of course, that the location of the passages 86, 88, and 90 within the valve plate, and the configurations of these passages relative the upstream and downstream orifices may be altered and remain with the contemplation of this invention. It is only necessary that the passages 86 for simultaneous introduction of fluid be adjacent each other to simultaneously communicate with the respective orifices in the partitions, and that each passage 86, 88, and 90 communicates with the downstream orifice 76 before and after the passage communicates with the upstream orifice 74. It is also apparent that modifications may be made to rotatably slide the passages in communication with the orifices and remain within the contemplation of this invention. Further, provision of other orifices and passages within the partitions and value plate, respectively, will be seen to increase the number of fluids handled by a valve embodying the teachings of this invention.

Referring to FIG. 7, an elevational view substantially in section of a second embodiment of a double valve apparatus embodying the teachings of this invention is shown. The valve 100 shown in FIG. 7 includes a casing 102 which is connected within a first (for example, hot water) flow line 104, as by threaded connection 106. The double valve arrangement is connected to a suitable mixing region 108, downstream of the double valve 100. It is understood that a double valve arrangement 100 is provided for each fluid stream controlled. However, the mixing region 108 may be common to all double valves 100 utilized in a particular flow control system. Within the casing 102 is disposed a fluid inlet region 112, transition or connecting chamber 114, and a fluid outlet region 116 leading into the mixing region 108. Within each valve member 100, a first (upstream) valve chamber 120 of the sliding plate type isolates the inlet region 112 from the connecting chamber 114 while the plate 120 is in the closed position shown in FIG. 7. A second (downstream) valve member 124 of the reciprocal plug type isolates the connecting chamber 114 from the fluid outlet region 116.

The first, upstream, valve 120 comprises a plate 126 fabricated of ceramic, hard plastic, steel, or other suitable material covered with a layer of suitable low-friction material, such as Teflon, to a predetermined thickness. The plate 126 has an opening 128 therein. The plate 126 slidably extends through an opening 130 provided within the casing 102 to its pivotal connection 132 to a yoke 134. The valve plate 126 seats against an annular valve seat 136 with the force of the fluid within the fluid inlet region 112, forcing the plate 126 into abutting contact with the seat 136. To further enhance the seal between the plate and seat, O-ring seals 138 may be provided.

The second valve member 124 comprises a substantially disc-like plug member 140 fabricated of suitable corrosion-resistant material such as plastic or, in the alternative, neoprene rubber or other synthetic material, or in the further alternative, steel, covered with a predetermined thickness of Teflon. A valve stem 142 extends through an opening 144 provided in the casing 102 to a pivotal connection 146 with the yoke 134. The valve plug 142 seats against a substantially annular valve seat 148 fabricated of material similar to the valve seat 136.

External to the valve casing 102 and mounted on a protrusion 150 is an actuator lever generally indicated by 152, having legs 154 and 156. The leg 154 is pivotally connected through a pivot pin 158 to an arm 160. The arm 160 is itself pivotally connected, as at 162, to the yoke 134. In operation, actuation of the actuator leg 156 in a direction indicated in FIG. 7 by an arrow 164 imparts an actuating force through the pivoting connection, 158 and 162 to move the valves 120 and 124 from their associated seats 136 and 142, respectively, and to permit introduction of fluid from the inlet region 112 into the connecting chamber 114 and then to the outlet region 116. The valves 120 and 124 are arranged such that the second valve member 124 opens first to permit communication between the connecting chamber 114 and the outlet region 116 before fluid from the inlet region 112 enters the connecting chamber 114. Continued application of force in the direction indicated by arrow 164 causes the sliding plate 126 and the opening 128 to move into communication with the annular seat 136 to permit fluid to enter the connecting chamber 114 from the fluid inlet region 112.

It may thus be appreciated that a double valve apparatus is provided in which the downstream valve plug 124 opens or unseats before and closes or seats after the unseating and seating, respectively, of an upstream plate valve 120 to thereby prevent wear across the second valve 124. Thus, longer life of a valve 100 embodying the teachings of this invention is anticipated. It is, of course, understood that a double valve arrangement whereby opening of the valves 120 and 124 follows from a clockwise rotation of the actuator 152 is within the contemplation of this invention.

It may be appreciated that if a fluid flow control system is desired whereby single-handed control of two or more fluid streams can be effected (such as hot and cold running water), it is merely necessary to dispose a plurality of double valves 100 in proximity with each other such that the actuators 152 of each are next-adjacent to each other. The number of valves 100 in the plurality depends, of course, upon the number of fluid streams over which single-handed control is desired.

From the foregoing embodiments it is appreciated that a long-life, substantially leak-free double valve arrangement is disclosed. Valves embodying the teachings of this invention are useful for the single-handed control flow of different fluids of different compositions or temperatures, such as hot and cold water. Mixing of the two fluid streams takes place downstream of the double valve arrangement, and fluids may be selected with single-handed operation of an actuator.

What is claimed is:

1. A flow control apparatus comprising:
   a casing adapted for interconnection in a fluid flow conduit;
   an upstream partition mounted within said casing, said upstream partition having a rectangular orifice therein said rectangular orifice having a flow cross section area less than the flow cross section of said conduit;
   a downstream partition mounted within said casing, said downstream partition having a rectangular orifice therein, said rectangular orifice having a flow cross section area less than the flow cross section of said conduit yet larger than the flow cross section of said orifice in said upstream partition;
   said upstream and said downstream partitions cooperating with said casing to define a separate valve plate chamber; and,
   a valve plate slidably moveable within said valve plate chamber from a first, closed, to a second open, position, said valve plate having a rectangular passage therein, said passage having a flow cross section substantially equal to the flow cross section of said rectangular orifice in said downstream partition;
   means for moving said valve plate from the first to the second position within said valve plate chamber;
   said valve plate in said first, closed, position blocking communication between said rectangular orifice in said upstream partition and said rectangular orifice in said downstream partition,
   said rectangular passage in said valve plate registering with said orifice in said upstream partition and said orifice in said downstream partition when said valve plate is in said second, open, position, with the axes of each of said orifices and said passage being in parallel relationship when said valve plate is in the open position;
   movement of said valve plate within said valve plate chamber in response to said moving means disposing said rectangular orifice in said valve plate chamber in fluid communication with said rectangular orifice in said downstream partition before said passage in said valve plate is in fluid communication with said rectangular orifice in said upstream partition to thereby minimize direct fluid impingement on said partition about said downstream orifice as said valve plate moves from said first, closed, to said second, open, position.

2. The flow control apparatus of claim 1, further comprising first seal means disposed between said valve plate and said first, upstream, partition for preventing fluid communication between said orifice in said first, upstream, partition and said valve plate chamber.

3. The flow control apparatus of claim 2, further comprising second seal means disposed between said valve plate and said second, downstream, partition for preventing fluid communication between said orifice in said second, downstream, partition and said valve plate chamber.

4. The flow control apparatus of claim 3, further comprising a layer of material having a predetermined thickness and a predetermined coefficient of friction associated therewith disposed about said orifice in said first, upstream, partition and about said orifice in said second, downstream, partition.

5. The flow control apparatus of claim 1, wherein said first, upstream, partition and said second, downstream, partition are disposed within said casing substantially parallel to each other, said valve plate being slidable within said valve plate chamber from said first, closed, to second, open, position.

6. The flow control apparatus of claim 3, wherein said first and said second seal means each have a substantially circular portion and a substantially diametrically disposed portion.

7. The flow control apparatus of claim 1, further comprising a layer of material having a predetermined thickness and a predetermined coefficient of friction disposed on said valve plate.

8. The flow control apparatus of claim 1, wherein said first, upstream, partition and said second, downstream, partition are substantially parallel to each other and wherein said orifice in said first, upstream, partition and said orifice in said second, downstream, partition are each substantially rectangular in cross section area.

9. The flow control apparatus of claim 8, wherein said passage in said valve plate is substantially rectangular in cross section, the longer side of the rectangular in the passage in said valve plate being substantially parallel to the longer sides of the orifice disposed in said first, upstream, partition and the orifice disposed in said second, downstream, partition.

* * * * *